(12) United States Patent
Carruyo

(10) Patent No.: US 9,937,904 B1
(45) Date of Patent: Apr. 10, 2018

(54) BRAKE UNIT FOR A CARGO DOLLY

(71) Applicant: Iscar GSE Corp., Miami Gardens, FL (US)

(72) Inventor: Israel S. Carruyo, Miami Gardens, FL (US)

(73) Assignee: Iscar GSE Corp., Miami, FL (US)

( * ) Notice: Subject to any disclaimer, the term of this patent is extended or adjusted under 35 U.S.C. 154(b) by 108 days.

(21) Appl. No.: 14/873,454

(22) Filed: Oct. 2, 2015

(51) Int. Cl.
*B60T 1/04* (2006.01)
*F16D 65/52* (2006.01)

(52) U.S. Cl.
CPC .............. *B60T 1/04* (2013.01); *F16D 65/52* (2013.01)

(58) Field of Classification Search
CPC ........... B62D 63/00; B62D 65/12; B60T 1/04; F16D 65/52; B61H 13/005
See application file for complete search history.

(56) References Cited

U.S. PATENT DOCUMENTS

| | | | | |
|---|---|---|---|---|
| 2,412,388 A | * | 12/1946 | Busch ................... | B61H 13/36 188/207 |
| 3,469,860 A | * | 9/1969 | Hutchens .............. | B60G 5/047 267/52 |
| 5,295,444 A | * | 3/1994 | Irle ....................... | B61F 3/02 105/199.1 |
| 8,851,488 B2 | | 10/2014 | Carruyo | |
| 2004/0080135 A1 | * | 4/2004 | Dudding ................ | B60G 7/04 280/124.163 |
| 2006/0244236 A1 | * | 11/2006 | Cortez ................... | B60G 11/113 280/124.175 |
| 2012/0199427 A1 | * | 8/2012 | Kuhr ..................... | F16D 65/08 188/242 |

FOREIGN PATENT DOCUMENTS

DE            2906232 A  *  8/1980

* cited by examiner

*Primary Examiner* — Melody M Burch
(74) *Attorney, Agent, or Firm* — Gable Gotwals

(57) ABSTRACT

A rear brake unit for a cargo dolly includes a left and a right brake that each have a leaf spring with an eye end and a loop end. The eye end of the leaf spring is fixed but can rotate about its pin and the loop end of the leaf spring can slide in relation to a loop end pin when the brake shoe is in a braking position. The movement of the leaf spring allows the brake shoe to accommodate uneven tire wear between the pair of tires and apply effective braking force to each tire. The brakes are also connected to one another by a bar arranged to pivot about a center point of the brake unit, thereby allowing the brake unit to accommodate uneven tire wear between the left and right pair of rear tires.

18 Claims, 9 Drawing Sheets

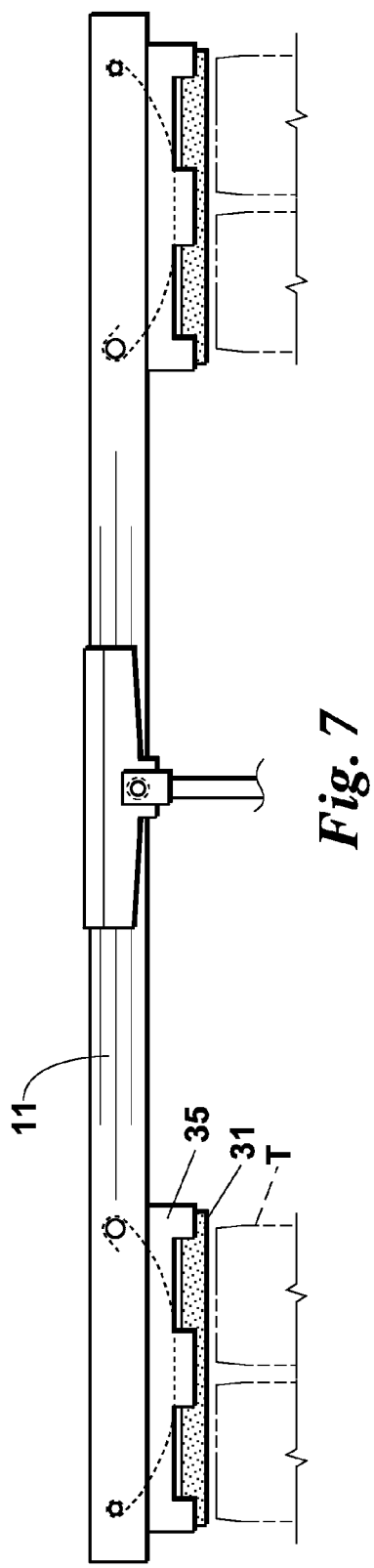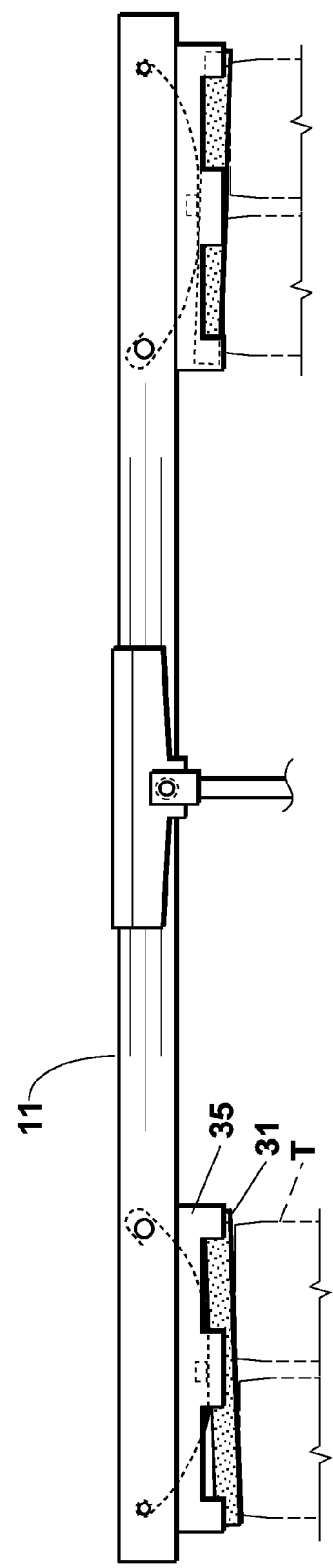

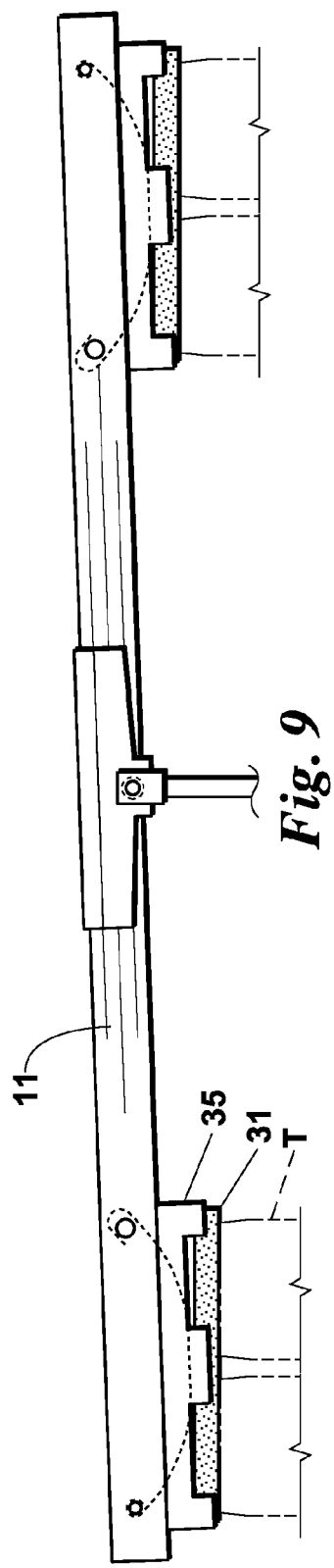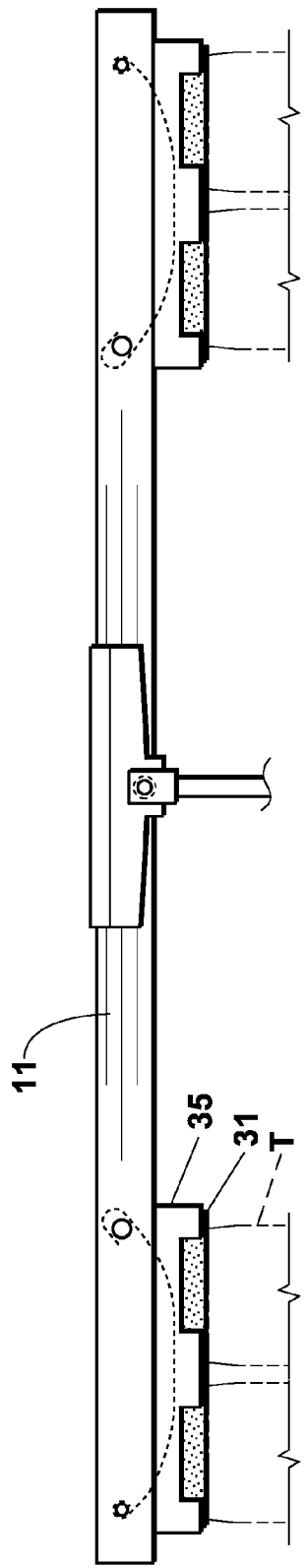

BRAKE UNIT FOR A CARGO DOLLY

BACKGROUND OF THE INVENTION

This invention relates to mechanical brake units for cargo dollies like those used by airport ground services to transport unit load devices, cargo pallets, and baggage.

Cargo dollies stop by actuating a mechanical brake unit that is connected by a tie rod to the tow bar. The brake, which is positioned just ahead of the rear tires (toward the forward end of the dolly), automatically pushes against and locks the rear tires when the tow bar is in a vertical position and pulls away from and releases the tires when the tow bar is in a horizontal position (see e.g. U.S. Pat. No. 8,851,488 B2 at FIG. 4). A compression spring that surrounds tie rod keeps the left and right brake pad weldments pressing against the tires. The spring does not store energy during the braking process. Alternatively, or in addition to the spring, the tie rod includes an adjustment weldment. However, each style of brake loses its effectiveness as the rear tires wear.

Tire wear can be substantial. It is not uncommon for the tires to remain in service until about a ½ inch of tread wear occurs (taking a 4.00×8 solid tire down to about 14¾ to 15-inches in diameter). Even more troublesome, the wear oftentimes is uneven within and between each left and right pair of tires.

Because the dollies can hold up to 15,000 pounds, and are used on inclines and around people and expensive equipment, braking effectiveness and reliability is a critical safety and cost issue. Therefore, a need exists for an improved rear brake unit.

SUMMARY OF THE INVENTION

A preferred embodiment of a rear brake unit for a cargo dolly made according to this invention includes a left brake and a right brake that each have a leaf spring with an eye end and a loop end and a brake shoe connected to the center point of the leaf spring. The eye end of the leaf spring is fixed but can rotate about its pin and the loop end of the leaf spring can slide in relation to a loop end pin when the brake shoe is in a braking position. As the brake is applied, the leaf springs stores energy that keeps the effectiveness of the brake system up to the limit of the tire, even as the tire wears from its original size.

The movement of the leaf spring allows the brake shoe to accommodate uneven tire wear between the pair of tires opposing the brake shoe and apply effective braking force to each tire. The brakes are also connected to one another by a bar arranged to pivot about a center point of the brake unit, thereby allowing the brake unit to accommodate uneven tire wear between the left and right pair of rear tires. The brakes sit rearward of the tires and are activated when the bar is moved toward a forward end of the cargo dolly. A weldment having tire receiving slots can be connected to the bar to partially house each brake.

Objectives of this invention include providing a rear brake unit that (1) does not make use of compression springs for braking or require an adjustment weldment; (2) is arranged to store energy during the braking process; (3) does not lose braking effectiveness because of uneven tire tread wear within a pair of rear tires or between pairs of rear tires; (4) can maintain braking effectiveness under industry standard test conditions at full load on a 20° incline and also, preferably, on a 30° incline; (5) requires less force be applied on the tow bar to actuate the brake than prior art brake units require; (6) can be used in retrofit applications to replace prior art mechanical brake units; and (57) is easier to maintain and uses fewer parts than prior art mechanical brake units;

BRIEF DESCRIPTION OF THE DRAWINGS

FIG. 3 is an isometric view of the rear brake unit of FIG. 1 as it would be positioned behind the rear wheels of a cargo dolly.

FIG. 6 is a top view of the brake shoe and leaf spring arrangement of FIG. 5.

FIG. 7 is a top view of the rear brake unit of FIG. 1 in a non-braking position relative to tires showing even wear both within and between the left and right pairs of tires (compare FIG. 10).

FIG. 8 is a top view of the rear brake unit of FIG. 1 in a braking position relative to tires showing uneven wear within the left pair of tires.

FIG. 9 is an exaggerated top view of the braking position of FIG. 8 and illustrates the rear brake unit articulating about a pin to accommodate the uneven wear.

FIG. 10 is a top view of the rear brake unit of FIG. 1 in a braking position relative to tires showing even wear both within and between the left and right pairs of tires (compare FIG. 7).

ELEMENTS USED IN THE DRAWINGS AND DETAILED DESCRIPTION

Figure 1:
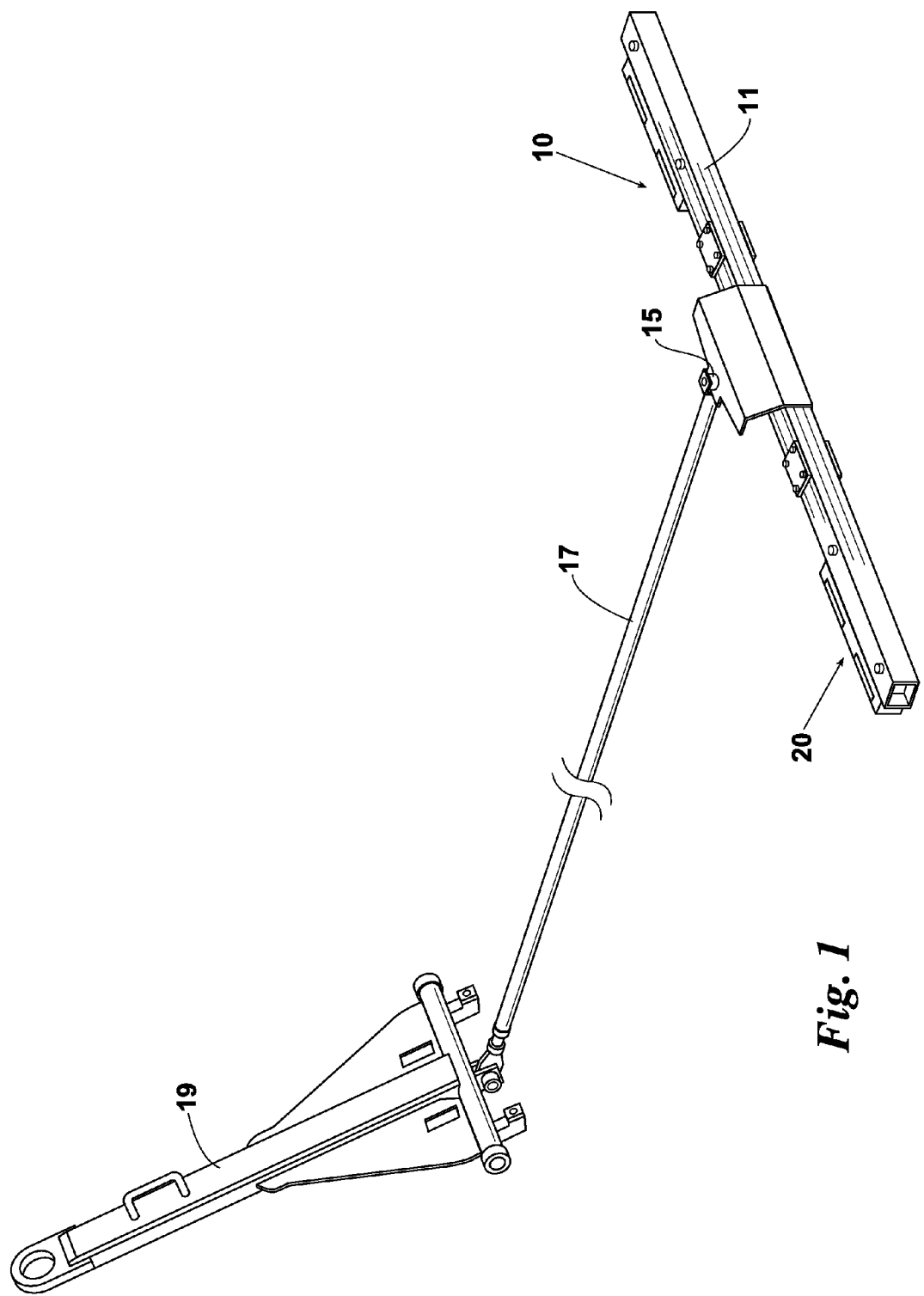
FIG. 1 is an isometric view of a preferred embodiment of a rear brake unit made according to this invention. The brake unit is positioned behind the rear wheels of a cargo dolly (see e.g.
Figure 2:
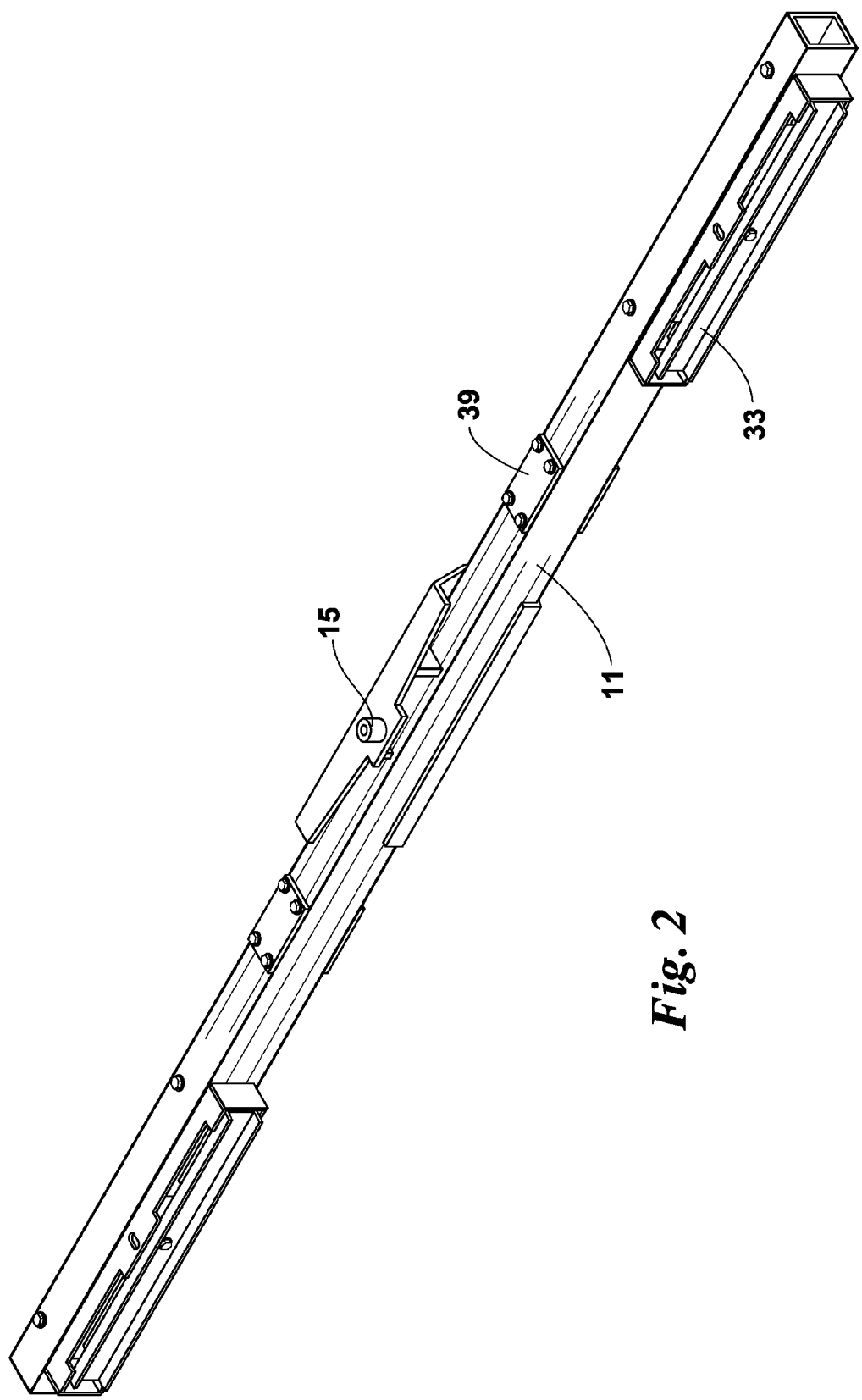
FIG. 2 is an isometric view of the rear brake unit of FIG. 1.
Figure 3:
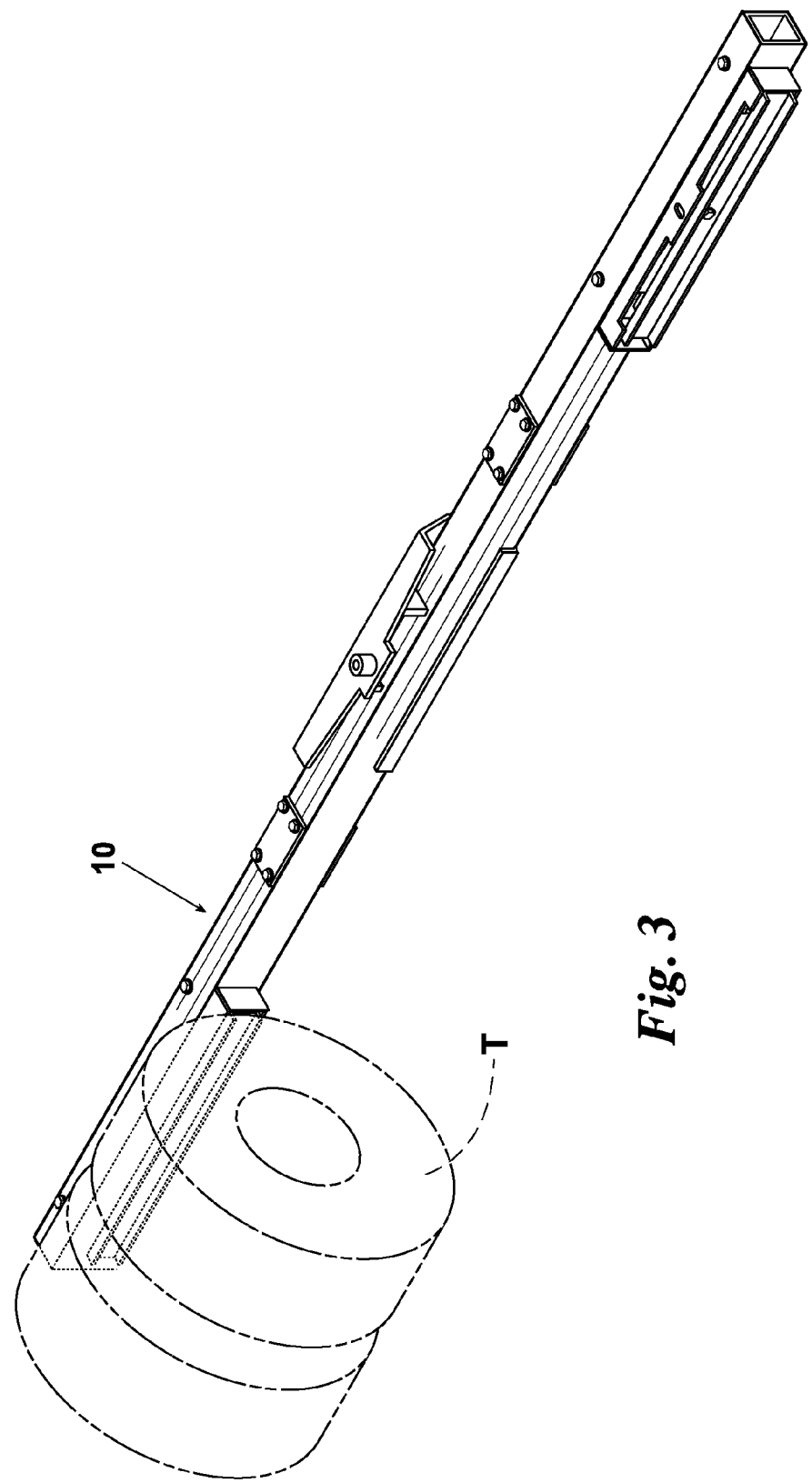
FIGS. 3 & 6) and automatically pulls against and locks the rear wheels when the tow bar is in a vertical position and pushes away from and releases the tires when the tow bar is in a horizontal position.

10 Brake unit
11 Bar
15 Center point or pin
17 Tie rod
19 Tow bar
20 Brake
21 Leaf spring
23 Center point
25 Eye (fixed) end
27 Eye end pin
29 Loop (sliding) end
31 Loop end pin
33 Brake shoe
34 Horizontal leg
35 Weldment or housing
37 Slot or slotted portion
39 Wear pad
T Rear tire or wheel

DETAILED DESCRIPTION OF THE PREFERRED EMBODIMENTS

Figure 11:
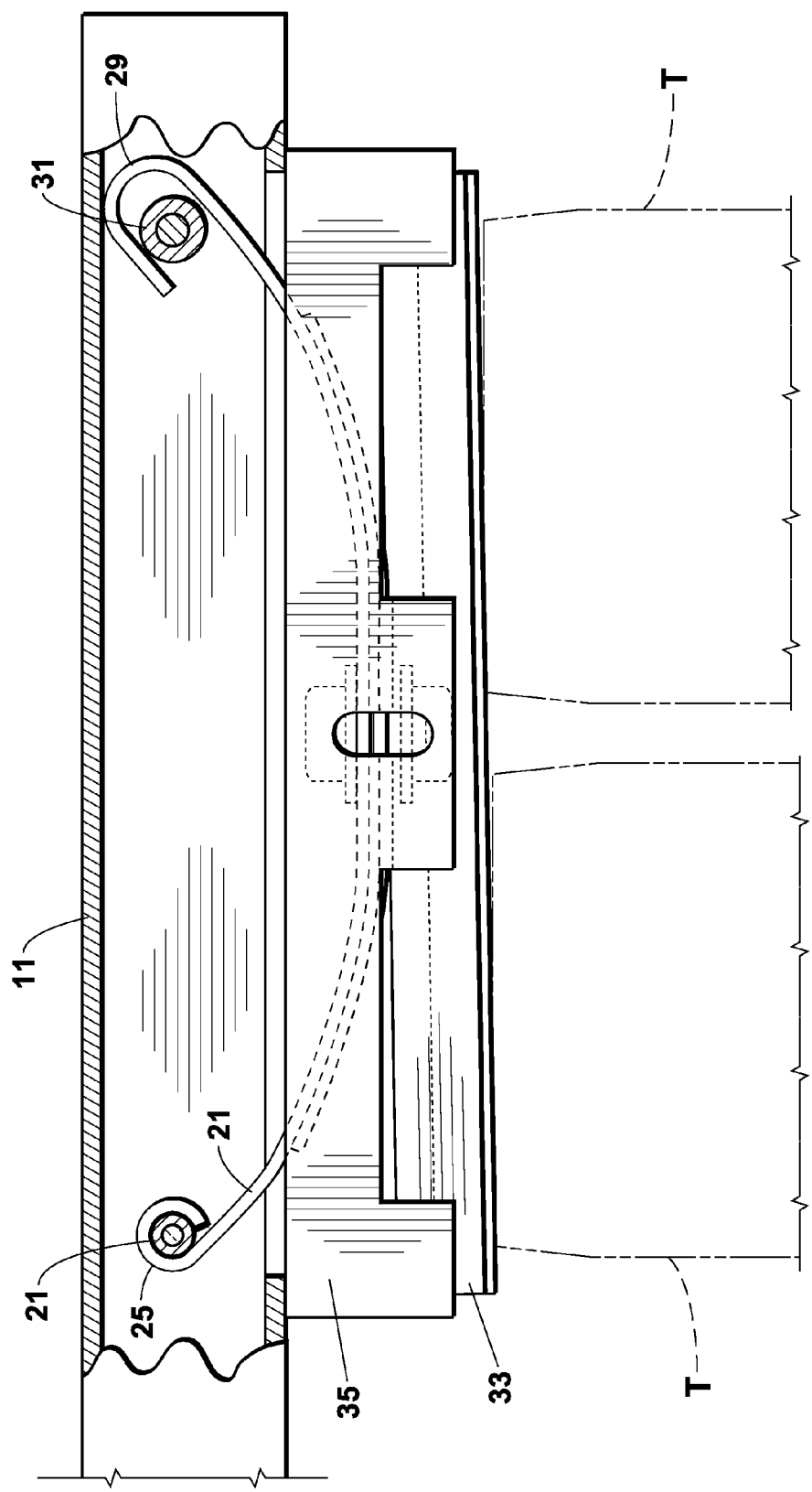
FIG. 11 is a top view of the brake shoe and leaf spring arrangement of FIG. 5 and illustrates the loop (free) end of the leaf spring moving slightly away from its pin yet remaining captured by the pin and placing the brake shoe at an oblique angle relative to the bar and in contact with the tires left and right of the center point of the leaf spring.

Referring to the drawings, and first to FIGS. 1 to 6, a preferred embodiment of a rear brake unit 10 made according to this invention includes a left and a right brake 20 which apply braking force through a leaf spring 21. Because leaf spring 21 can "slide" (see e.g. FIG. 11) when the brake 20 is braking, the brake shoe 33 can remain in contact with both rear tires T even if the tires T have different amounts of tread wear between them (see e.g. FIGS. 8 to 11). Unlike the prior art compression spring and its arrangement in a brake unit, leaf spring 21 stores energy as the brake 20 is applied to the tire T, thereby causing brake 20 to maintain effective braking action up to the limit of the tire T and as the tire T wears. Additionally, actuating the brakes 20 with tow bar 19 takes less force than the prior art brake units require because leaf springs 21 take the action and store the energy. Almost all airlines require cargo dollies to stay braked at full load on a 20° incline. In tests conducted by the inventor, brake unit 10 proved effective in braking an Iscar GSE Inc. (Miami Garden's, FL) LD7 cargo dolly loaded at capacity (15,000 pounds) and resting on a 30° incline. In another test, an LD7 cargo dolly equipped with brake unit 10 was loaded with 10,000 pounds while braking on a 30° incline with four people attempting to push it down the incline. The dolly did not move. In yet another test, an LD7 cargo dolly equipped with brake unit 10 and fully loaded was pushed by a fork lift. The brakes 20 prevented the tires T from rotating and the braked tires T left skid marks on the ground as the fork lift pushed the dolly. The brake unit did not lose braking effectiveness in tests where there was a ½-inch difference in tread wear within a pair of rear tires T or between the left and right pair of rear tires T.

Brake unit 10 is arranged rearward of the rear tires T (see FIG. 7), with the left and right brakes 20 connected to one another by a bar 11 arranged to pivot about a center point or pin 15 of the brake unit 10 (see e.g. FIG. 9). Pin 15 is connected by a tie rod 17 to the dolly's tow bar 19. Each brake 20 automatically pulls against and locks the rear tires T when the tow bar 19 is in a vertical position and pushes away from and release the tires T when the tow bar 19 is in a horizontal position. Brake unit 10 can be attached to the frame of the cargo dolly by U-bolts (not shown). Wear pads 39 help lubricate and protect the brake unit 10 as bar 11 is pulled, pushed and pivoted.

Figure 4:
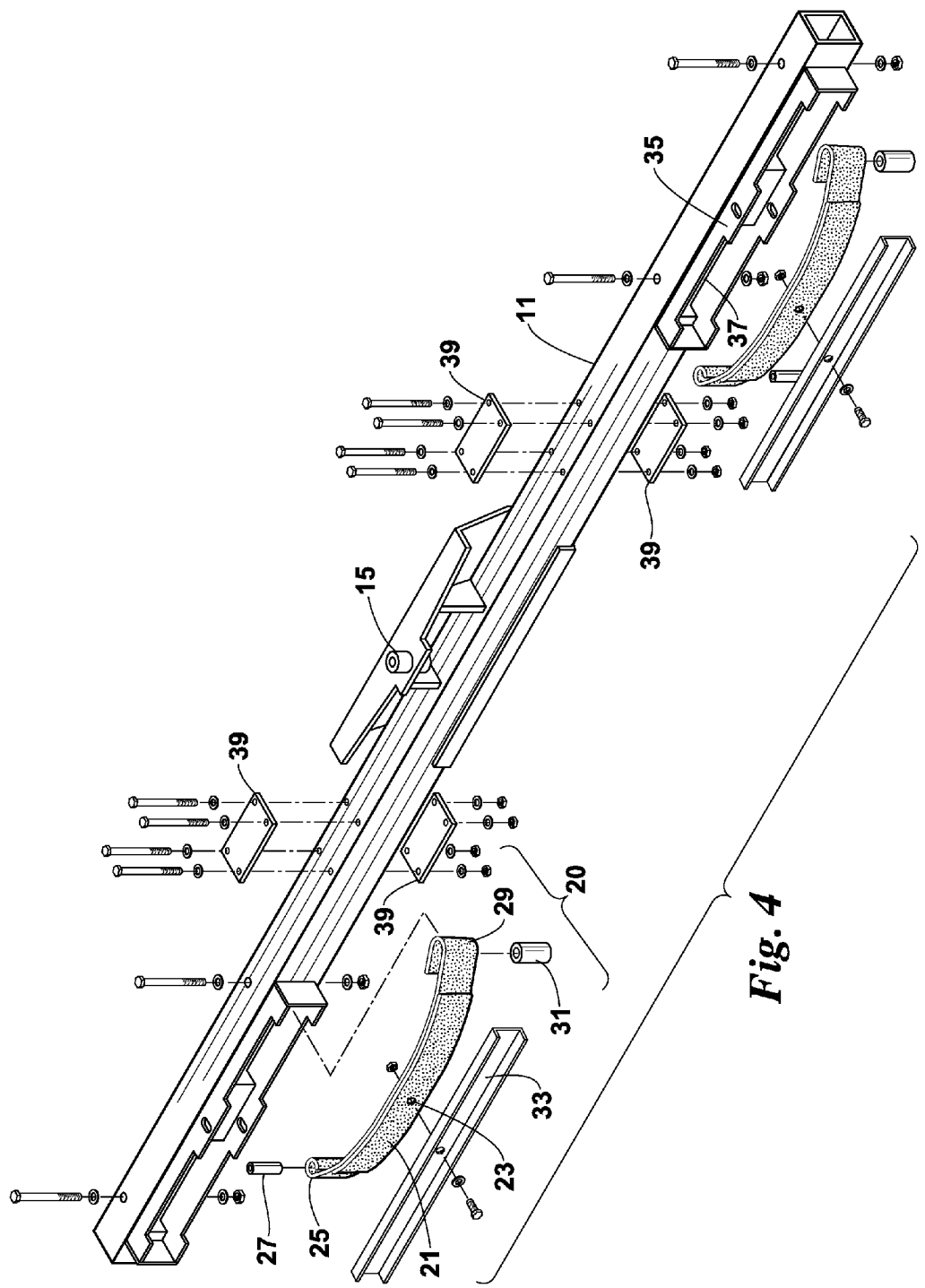
FIG. 4 is an exploded assembly view of the rear brake unit of FIG. 1.
Figure 5:
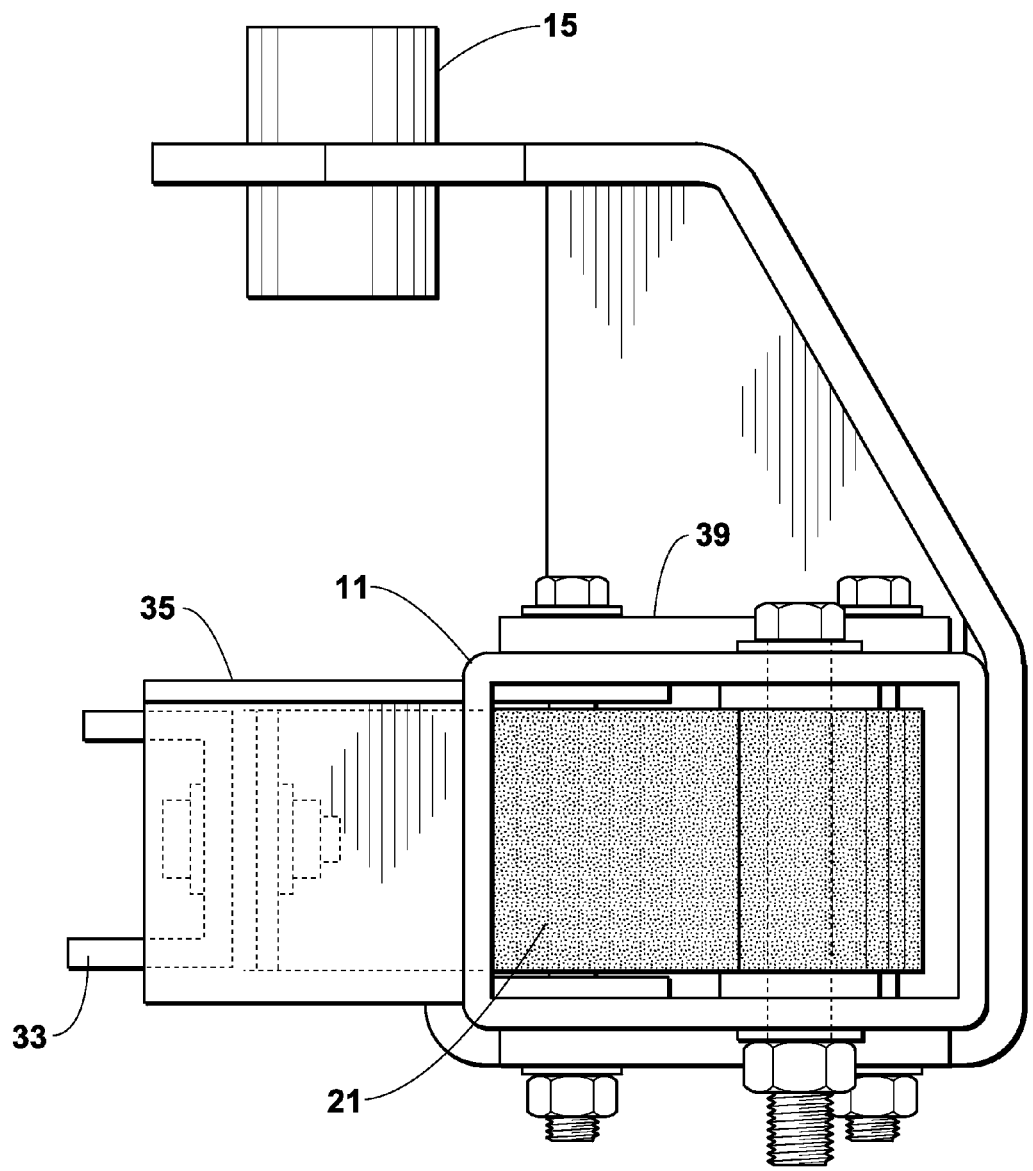
FIG. 5 is a side view of the rear brake unit of FIG. 1.
Figure 6:
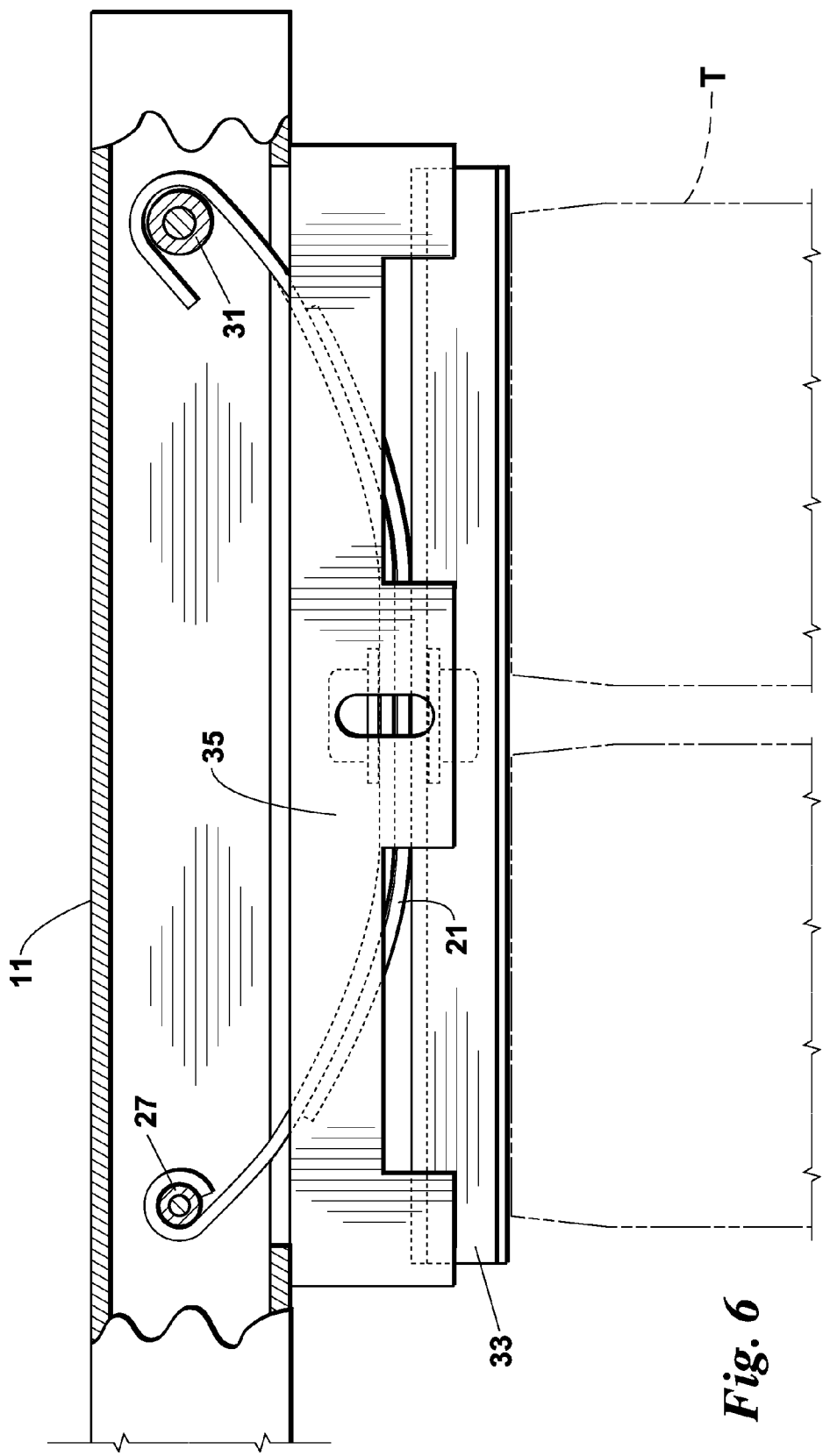

Referring now to FIGS. 4 to 6, each brake 20 includes a leaf spring 21 with an eye (pinned) end 25 and a loop (sliding) end 29. A brake shoe 33, preferably in the shape of a channel having one leg longer than the other (see e.g. FIG. 5), is connected to the center point 23 of the leaf spring 21. A weldment or housing 35 connected to the bar 11 partially houses the brake 20. The weldment 35 may have a slotted portion 37 sized to accommodate a width of the tire T. As the brake shoe 33 comes into contact with the opposing face of the rear tires T, eye end 25 can rotate about eye end pin 27 and loop end 29 can slide or move relative to pin 31 to allow brake shoe 33 to change its angular orientation in case of uneven tire tread wear (see e.g. FIG. 11).

The ability of leaf spring 21 to move either by pivoting or sliding (or both) is important. If leaf spring 21 is prevented from any movement, the spring 21 might rub or seize as the tires T tend to want to turn when the dolly is on an incline or when pushed or pulled. Depending on which side of the dolly gets the swivel action, the brake 20 bites more on the opposite side. If the tire T tries to turn clockwise, the bottom of brake shoe 33 bites more onto the opposing face of the tire T. Conversely, if the tire T tires to turn counterclockwise, the top of brake shoe 33 bites more on the opposing face of the tire T.

Unlike prior art brake shoes, brake shoe 33 preferably has two different length horizontal legs 34. Shoe 34 can be oriented so the longer of the two legs 34 is at the bottom of the shoe 34, like that shown in FIG. 5, or at the top of the shoe 34. The reason for the different length legs 34 is that, in practice, it is hard to align a brake unit exactly with the center of a tire. The small difference in length compensates for this misalignment (and, if perfectly aligned, the legs 34 can be the same length). In many of the inventor's applications, the centerline of bar 11 sits in a horizontal plane below the centerline of the tire and, therefore, brake shoe 33 is oriented with the longer leg 34 at the bottom.

The following claims define the scope of the invention and cover elements equivalent to those recited in the claims.

What is claimed is:

1. A brake unit for a cargo dolly, the brake unit comprising:
   a left brake and a right brake connected to one another by a bar arranged to pivot about a center point of the brake unit, wherein said bar is rearward of tires of the cargo dolly;
   the left and right brakes each having:
   a leaf spring with an eye end and a loop end; and
   a brake shoe connected to a center point of the leaf spring, wherein said brake shoe selectively engages a respective tire.

2. A brake unit according to claim 1 further comprising the loop end of the leaf spring arranged to slide in relation to a loop end pin when the brake shoe is in a braking position.

3. A brake unit according to claim 2 further comprising the movement of the loop end permitting the brake shoe to assume a different angular position than the bar relative to a wheel axle.

4. A brake unit for a cargo dolly, the brake unit comprising:
   a left brake and a right brake connected to one another by a bar arranged to pivot about a center point of the brake unit;
   the left brake and right brake each having:
   a leaf spring with an eye end and a loop end;
   a brake shoe connected to a center point of the leaf spring; and
   the eye end of the leaf spring arranged to rotate about an eye end pin when the brake shoe is in a braking position.

5. A brake unit according to claim 4 further comprising the movement of the eye end permitting the brake shoe to assume a different angular position than the bar relative to a wheel axle.

6. A brake unit for a cargo dolly, the brake unit comprising:
   a left brake and a right brake connected to one another by a bar arranged to pivot about a center point of the brake unit;
   the left brake and right brake each having:
   a leaf spring with an eye end and a loop end;
   a brake shoe connected to a center point of the leaf spring; and
   the brake shoe being open channel-shaped, an upper horizontal leg of the brake shoe having a different length than a lower horizontal leg of the brake shoe.

7. A brake unit according to claim 1 further comprising the left and right brake arranged to be activated when the bar is moved toward a forward end of the cargo dolly.

8. A brake unit for a cargo dolly, the brake unit comprising:
- a left brake and a right brake connected to one another by a bar arranged to pivot about a center point of the brake unit;
- the left brake and right brake each having:
- a leaf spring with an eye end and a loop end;
- a brake shoe connected to a center point of the leaf spring; and
- a tie rod connecting the brake unit to a tow bar of the cargo dolly.

9. A brake unit according to claim 1 further comprising a weldment connected to the bar, the weldment partially housing one of the left and right brakes.

10. A brake unit for a cargo dolly, the brake unit comprising:
- a left brake and a right brake connected to one another by a bar arranged to pivot about a center point of the brake unit;
- the left brake and right brake each having:
- a leaf spring with an eye end and a loop end;
- a brake shoe connected to a center point of the leaf spring;
- a weldment connected to the bar, the weldment partially housing one of the left and right brakes; and
- the weldment having a slotted portion sized to accommodate a width of a cargo dolly tire.

11. A brake unit for a cargo dolly, the brake unit comprising:
- a left brake and a right brake connected to one another by a bar arranged to pivot about a center point of the brake unit;
- the left brake and right brake each having:
- a leaf spring with an eye end and a loop end; and
- a brake shoe connected to a center point of the leaf spring; and
- wherein the bar is arranged relative to a cargo dolly tire so that a centerline of the bar is below a centerline of the tire.

12. A brake unit for a cargo dolly, the brake unit comprising:
- a left brake and a right brake connected to one another by a bar arranged to pivot about a center point of the brake unit;
- the left and right brakes each having:
- a leaf spring arranged to rotate at one end and slide at an opposite end; and
- an open channel-shaped brake shoe connected to a center point of the leaf spring and having two horizontal legs of different lengths.

13. A brake unit according to claim 12 further comprising the leaf spring permitting the brake shoe to assume a different angular position than the bar relative to a wheel axle.

14. A brake unit according to claim 12 further comprising the left and right brake arranged to be activated when the bar is moved toward a forward end of the cargo dolly.

15. A brake unit according to claim 12 further comprising a tie rod connecting the brake unit to a tow bar of the cargo dolly.

16. A brake unit according to claim 12 further comprising a weldment connected to the bar, the weldment partially housing one of the left and right brakes.

17. A brake unit according to claim 16 further comprising the weldment having a slotted portion sized to accommodate a width of a cargo dolly tire.

18. A brake unit according to claim 12 wherein the bar is arranged relative to a cargo dolly tire so that a centerline of the bar lies in a horizontal plane below that of a centerline of the tire.

* * * * *